June 14, 1927.
H. A. LEONHAUSER
1,631,969
AUTOMATIC SLACK ADJUSTER
Filed July 2, 1925    2 Sheets-Sheet 1
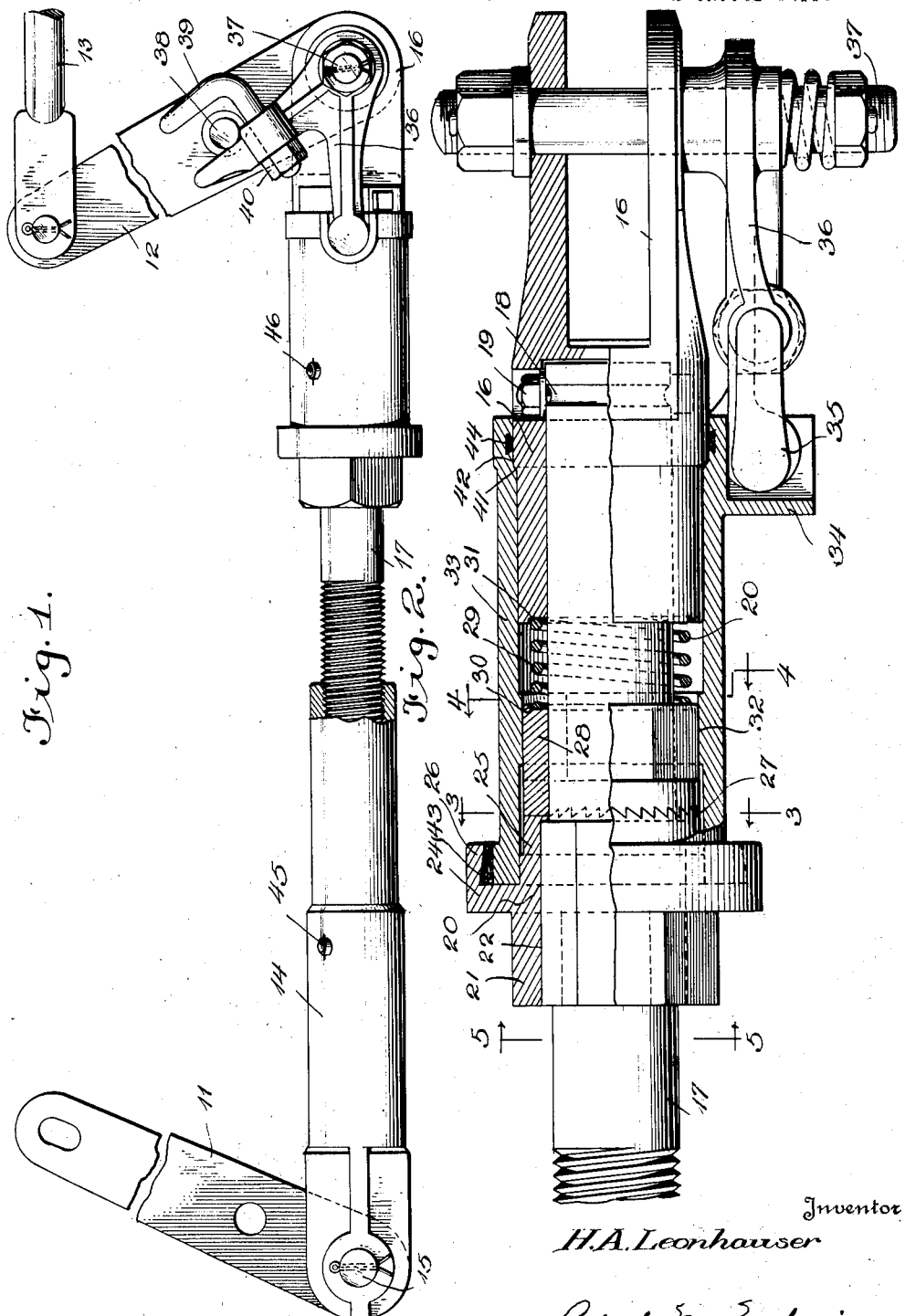

June 14, 1927.

H. A. LEONHAUSER 1,631,969

AUTOMATIC SLACK ADJUSTER

Filed July 2, 1925

Inventor

H. A. Leonhauser

By Robert M. Zacharias

Attorney

Patented June 14, 1927.

1,631,969

UNITED STATES PATENT OFFICE.

HENRY A. LEONHAUSER, OF BALTIMORE, MARYLAND, ASSIGNOR TO THE J. G. BRILL COMPANY, OF PHILADELPHIA, PENNSYLVANIA, A CORPORATION OF PENNSYLVANIA.

AUTOMATIC SLACK ADJUSTER.

Application filed July 2, 1925. Serial No. 41,115.

This invention relates to automatic slack adjusters, for use as a part of brake rigging, and has for its object to provide simple, efficient and reliable mechanism for automatically compensating for the wear of brake shoes, car wheels, brake rigging and other parts, to maintain uniform clearance between the brake shoes and car wheels, and uniform movement of the brake applying devices. A further object is to provide such an apparatus which may be economically manufactured and readily repaired, and in which the moving parts are enclosed and may be efficiently lubricated.

Further objects of the invention and the novel features thereof will be understood from the following specification, taken together with the accompanying drawings, in which—

Figure 1 is a view in elevation, partly in section, of an embodiment of the invention;

Figure 2 is a fragmentary horizontal section of a part of the structure shown in Fig. 1;

Figure 3:
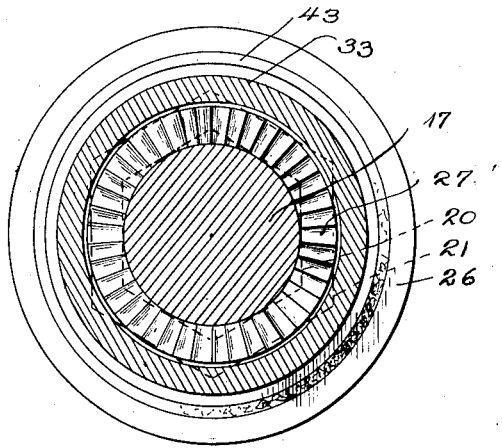
Figure 4:
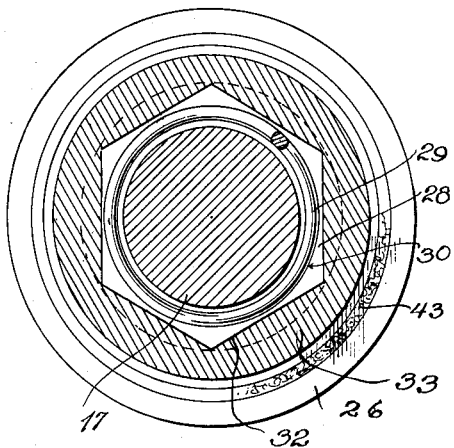
Figure 5:
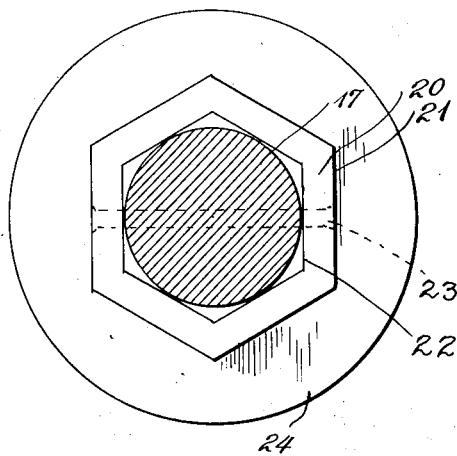
Figure 6:
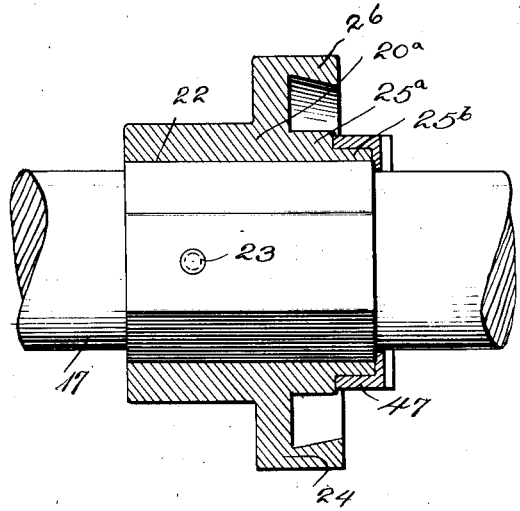

Figures 3, 4 and 5 are vertical sectional views of the structure shown in Fig. 2 and taken on the lines 3—3, 4—4, and 5—5 thereof, in the direction indicated by the arrows; and Fig. 6 is a sectional view, partly in elevation, of one of the parts shown in Fig. 2, but illustrating a slightly modified form.

In the construction shown the brakes are adapted to be operated by brake beams of the usual construction which are connected to dead lever 11 and live lever 12 respectively, the live lever being operated by a link 13. A head 14 is pivoted at 15 to the lower end of the dead lever 11, and is interiorly threaded, while a head 16 is pivoted to the lower end of the live lever 12, such heads 14 and 16 being connected together by a rod 17 which is threaded into the head 14, as shown in Fig. 1. The other end of the rod 17 is extended into the head 16 and is provided, adjacent its end, with an annular channel or groove 18, a bolt 19 passing through the head 16, tangentially to the rod, and engaging in the groove to hold the parts from endwise movement.

A collar 20 is fixed upon the rod 17 at some distance from the head 16, such collar having a hexagonal portion 21, by which it may be readily turned and fitting upon a hexagonal portion 22 of the rod as more clearly appears in Fig. 5, and a pin 23 is passed through the collar and the rod to hold them in fixed relation. The collar 20 is provided with an outwardly extending flange 24 and an annular bearing portion 25, and has an axially directed flange 26 overlying the bearing portion 25, for a purpose which will later appear. A housing sleeve 33 is rotatably carried upon the bearing portion 25 of the collar 20, and upon the head 16, both of which are telescopically received within it.

As shown in Figure 2, the end face of the annular bearing portion 25 of the collar 20 is serrated to provide ratchet teeth 27. A second ratchet member 28 is carried upon the rod 17 and provided with similar ratchet teeth corresponding in size and number to, and adapted to engage with, the teeth 27 of the collar 20, a spring 29 encircling the rod 17 and preferably seated in grooves 30 and 31, in the collar 28 and the end of the head 16, respectively, to yieldably hold the ratchet members in engagement.

The outer surface of the collar or ratchet member 28 is hexagonal and fits slidably in a similarly formed guideway 32 which is formed in the interior of the sleeve 33, so that the member 28 will rotate with the sleeve about the rod 17 but can slide toward and from the ratchet member 25. The sleeve 33 is provided with an exterior socket 34 which receives the ball end 35 of one arm of a rocker arm 36 which is pivoted at 37 on the same pivot which connects the head 16 to the lower end of the live lever 12. The other arm of the rocker arm 36 extends adjacent to a fulcrum pin 38 and carries an adjustment finger 39 which is adjustable by nut 40 to and from the opposite side of the fulcrum pin 38.

The sleeve 33 is slightly widened at one end to form an annular shoulder at 41, which engages with an annular shoulder 42 on the head 16, to prevent endwise movement of the sleeve in one direction, while the engagement of the sleeve with the flange 24 of the nut 20 will prevent it from moving in the opposite direction. A ring of packing material 43 is interposed between the end of the sleeve 33 and the flange 26 of collar 20, and a packing ring 44 is provided in a channel in the other end of the sleeve 33 for contact with the cylindrical portion of the head 16. Lubricating openings 45 and 46 are provided in the head 14 and in the sleeve 33, respectively, and are preferably fitted with spring pressed valves to prevent entrance of dirt or moisture.

In the modified structure shown in Fig. 6 the collar 20$^a$ is formed with a bearing portion 25$^a$, which is circular in cross section; and an extension 25$^b$ which is hexagonal. The ratchet member 47 is formed as a separate piece, having a hexagonal recess therein, and being forced in place upon the extension 25$^b$ and held in place in any suitable manner. When the brakes are applied by movement of link 13 toward the right, the motion of fulcrum pin 38 toward the right stops, and further movement of link 13 causes pivot 37 to move to the left, carrying with it the rocker arm 36. After a given movement, depending upon the clearance of adjustment finger 38, the ball end 35 of the rocker arm will be moved upwardly, rotating the sleeve 33 and, through it, the ratchet member 28. If the rotation of the member 28 is greater than the width of one of the teeth 27, the combined ratchet and collar 20 and rod 17 will be rotated slightly in the opposite direction when the brakes are released and the sleeve 33, rocker arm 36 and lever 12 are moved back to the position shown in Fig. 1, and, by reason of the threaded engagement of the rod 17 with the head 14, the link between pivots 15 and 37 will be slightly lengthened.

It will be understood that the engaging faces of the ratchet members, the contact of the moving ratchet in its guideway and the bearing surfaces on which the sleeve rotates, as well as the bearings of the spring and the contact of bolt 19 in the groove 18, are all housed within the sleeve and may be readily kept efficiently lubricated. The structure is simple and effective in operation and may be readily repaired.

It will also be understood that the invention is not limited to the exact details of the embodiment shown and described, but that various changes may be made therein without departing from the spirit of the invention which is defined in the following claims.

I claim:

1. In a slack adjuster, brake-lever connecting means comprising heads connected to said brake levers and an intermediate rod having threaded engagement with one of said heads and rotatable engagement with the other of said heads, and means for rotating said intermediate rod in one direction upon excessive movement of the brake levers comprising a ratchet member rigid with said intermediate rod, a second ratchet member rotatable relative to said rod, resilient means for holding said ratchet members in engagement, a sleeve rotatable upon said rigid ratchet member and having a guideway therein receiving said second ratchet member and adapted to transmit rotary motion thereto, said rigid ratchet member having a non-circular portion outside said sleeve to facilitate adjustment by hand, and means operable by motion of one of the brake levers for oscillating said sleeve.

2. In a slack adjuster, a brake lever connecting means comprising heads connected to the brake levers and an intermediate rod connecting said heads, said rod having threaded engagement with one head and rotatable engagement with the second head, a collar rigid with said rod and having ratchet teeth on one end face, a second collar rotatable and slidable on said rod and having ratchet teeth on one end face for engagement with those of said rigid collar, a spring cooperating with said second head for holding said collars in engagement, said rigid collar and said second head having annular abutments, a sleeve engaged between said abutments to house said ratchet members and having means for rotating said second collar, and means operable by movement of one of the brake levers for oscillating said sleeve.

3. In a slack adjuster, brake lever connecting means comprising heads pivoted to the brake levers, an intermediate rod having one end in threaded engagement with one head and having its other end rotatably connected to the second head and held from endwise movement relative thereto, a collar fixed upon said rod, a sleeve rotatably mounted between abutments on said collar and said second head, said collar having a flange surrounding the end of said sleeve, packing interposed between said sleeve and said flange and between said sleeve and said second head, mechanism housed in and operable by said sleeve for rotating said fixed collar and said rod in one direction, and means operable by movement of the brake levers for oscillating said sleeve.

4. In a slack adjuster, brake lever connecting means comprising heads connected to the brake levers, an intermediate rod having threaded engagement with one head and having its other end rotatably received in the second head and provided with a circumferential groove, a bolt passing through said second head and engaging tangentially in said groove to prevent relative endwise movement of said rod and said second head, a sleeve rotatably mounted on said rod and said second head, clutching means comprising a spring and a member resiliently movable by said spring housed in said sleeve for transmitting rotary movement from said sleeve to said intermediate rod in one direction, said bolt being located outside said sleeve, and means operable by movement of the brake levers for oscillating said sleeve.

In testimony whereof I affix my signature.

HENRY A. LEONHAUSER.